United States Patent
Mohanty et al.

(10) Patent No.: US 8,340,121 B2
(45) Date of Patent: Dec. 25, 2012

(54) METHOD AND APPARATUS FOR TRANSMISSION OF CIRCUIT SWITCHED VOICE OVER PACKET SWITCHED NETWORKS

(75) Inventors: Bibhu P. Mohanty, San Diego, CA (US); Etienne F. Chaponniere, Rome (IT); Mehmet Yavuz, San Diego, CA (US); Oronzo Flore, Ostuni (IT); Rohit Kapoor, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1161 days.

(21) Appl. No.: 12/195,749

(22) Filed: Aug. 21, 2008

(65) Prior Publication Data

US 2009/0129375 A1   May 21, 2009

Related U.S. Application Data

(60) Provisional application No. 60/957,305, filed on Aug. 22, 2007.

(51) Int. Cl.
*H04J 3/00* (2006.01)
(52) U.S. Cl. ...................................................... 370/464
(58) Field of Classification Search .................. 370/351, 370/352, 354
See application file for complete search history.

(56) References Cited

U.S. PATENT DOCUMENTS

| 2003/0147371 A1* | 8/2003 | Choi et al. ................... 370/341 |
| 2004/0165532 A1 | 8/2004 | Poor et al. |
| 2004/0217788 A1* | 11/2004 | Kim ................................ 327/158 |
| 2004/0246917 A1 | 12/2004 | Cheng et al. |
| 2005/0047393 A1* | 3/2005 | Liu ................................ 370/352 |
| 2005/0068931 A1 | 3/2005 | Cho et al. |
| 2005/0243831 A1 | 11/2005 | Zhang et al. |
| 2006/0133281 A1 | 6/2006 | Witherell et al. |
| 2007/0201437 A1* | 8/2007 | Kim et al. ...................... 370/352 |
| 2008/0198814 A1* | 8/2008 | Wengerter et al. ............. 370/336 |

FOREIGN PATENT DOCUMENTS

| KR | 1020020029422 | 4/2002 |
| KR | 20070065876 A | 6/2007 |
| RU | 2235432 C2 | 8/2004 |
| RU | 2005121561 | 1/2006 |
| RU | 2297104 C2 | 4/2007 |
| WO | WO0033503 | 6/2000 |
| WO | WO2004054311 | 6/2004 |
| WO | WO2005062550 | 7/2005 |

OTHER PUBLICATIONS

International Search Report—PCT/US08/074080, International Search Authority—European Patent Office, Nov. 20, 2008.
Written Opinion—PCT/US08/074080, International Search Authority—European Patent Office, Nov. 20, 2008.

* cited by examiner

*Primary Examiner* — Fan Ng
(74) *Attorney, Agent, or Firm* — Charles Chesney

(57) ABSTRACT

Systems and methodologies are described that facilitate and/or effectuate transmission of circuit switched voice over packet switched networks. The systems and methodologies provide for the receiving a first packet originating from access terminals and/or user equipment, determining within which hybrid automatic repeat request (HARQ) the first packet is received, ascertaining an amount of delay that is applied to the first packet before the first packet is forwarded into a core circuit switched network; and establishing a periodic time interval within which to convey subsequent packets that originate from the communicating access terminal and/or user equipment.

23 Claims, 11 Drawing Sheets

METHOD AND APPARATUS FOR TRANSMISSION OF CIRCUIT SWITCHED VOICE OVER PACKET SWITCHED NETWORKS

CROSS-REFERENCE TO RELATED APPLICATIONS

This application claims the benefit of U.S. Provisional Patent application Ser. No. 60/957,305 entitled "METHOD AND APPARATUS FOR TRANSMISSION OF CIRCUIT SWITCHED VOICE OVER PACKET SWITCHED NETWORKS" which was filed Aug. 22, 2007. The entirety of the aforementioned application is herein incorporated by reference.

BACKGROUND

I. Field

The following description relates generally to wireless communications, more particularly to methods and systems to improve network performance.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), High Speed Packet (HSPA, HSPA+), and others. Moreover, wireless communication systems can be designed to implement one or more standards, such as IS-95, CDMA2000, IS-856, W-CDMA, TD-SCDMA, and the like. Nevertheless, as the demand for high-rate and multimedia data services has grown there now lies a challenge in implementing efficient and robust High Speed Packet Access (HSPA) communication systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating and/or effectuating transmission of circuit switched voice over packet switched networks. The systems and methodologies in accordance with an aspect of the claimed subject matter provides for the receiving a first packet originating from access terminals and/or user equipment, determining within which hybrid automatic repeat request (HARQ) the first packet is received, ascertaining an amount of delay that is applied to the first packet before the first packet is forwarded into a core circuit switched network; and establishing a periodic time interval within which to convey subsequent packets that originate from the communicating access terminal and/or user equipment.

In accordance with an aspect of the claimed matter a method that effectuates transmission of circuit switched voice over packet switched networks is provided comprising: receiving a first packet originating from an access terminal, determining within which hybrid automatic repeat request (HARQ) the first packet is received, ascertaining an amount of delay that is applied to the first packet before the first packet is forwarded into a core circuit switched network, and establishing a periodic time interval within which to convey subsequent packets originating from the access terminal.

Additionally, in accordance with a further aspect of the claimed matter, a wireless communication apparatus that effectuates transmission of circuit switched voice over packet switched networks is also disclosed. The wireless communication apparatus can comprise means for receiving a first packet originating from an access terminal, means for determining within which hybrid automatic repeat request (HARQ) the first packet is received, means for ascertaining an amount of delay that is applied to the first packet before the first packet is forwarded into a core circuit switched network, and means for establishing a periodic time interval within which to convey subsequent packets originating from the access terminal.

In accordance with a further aspect of the claimed matter, a wireless communications apparatus that includes a memory that retains instructions related to receiving a first packet originating from an access terminal, determining within which hybrid automatic repeat request (HARQ) the first packet is received, ascertaining an amount of delay that is applied to the first packet before the first packet is forwarded into a core circuit switched network, and establishing a periodic time interval within which to convey subsequent packets originating from the access terminal, and a processor, coupled to the memory, configured to execute the instructions retained in the memory is also disclosed.

Moreover, in accordance with yet a further aspect of the claimed subject matter a machine-readable medium having stored thereon machine-executable instructions for: receiving a first packet originating from an access terminal, determining within which hybrid automatic repeat request (HARQ) the first packet is received, ascertaining an amount of delay that is applied to the first packet before the first packet is forwarded into a core circuit switched network, and establishing a periodic time interval within which to convey subsequent packets originating from the access terminal is also described.

Furthermore, in accordance with a further aspect of the claimed subject matter disclosure is made herein of in a wireless communications system, an apparatus comprising: a processor configured to: receive a first packet originating from an access terminal, determine within which hybrid automatic repeat request (HARQ) the first packet is received, ascertain an amount of delay that is applied to the first packet before the first packet is forwarded into a core circuit switched network, and establish a periodic time interval within which to convey subsequent packets originating from the access terminal. The first and subsequent packets can be conveyed with or without jitter utilizing a high speed packet access protocol wherein real time protocol (RTP) functionality can be provided by carrying a sequence number and a timestamp. The timestamp generally can be employed to differentiate between erased frames and discontinuous transmission (DTXed) frames wherein the timestamp is generally included in a newly defined packet data convergence protocol (PDCP) protocol data unit (PDU) type that can also carry an adaptive multi-rate (AMR) frame type.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
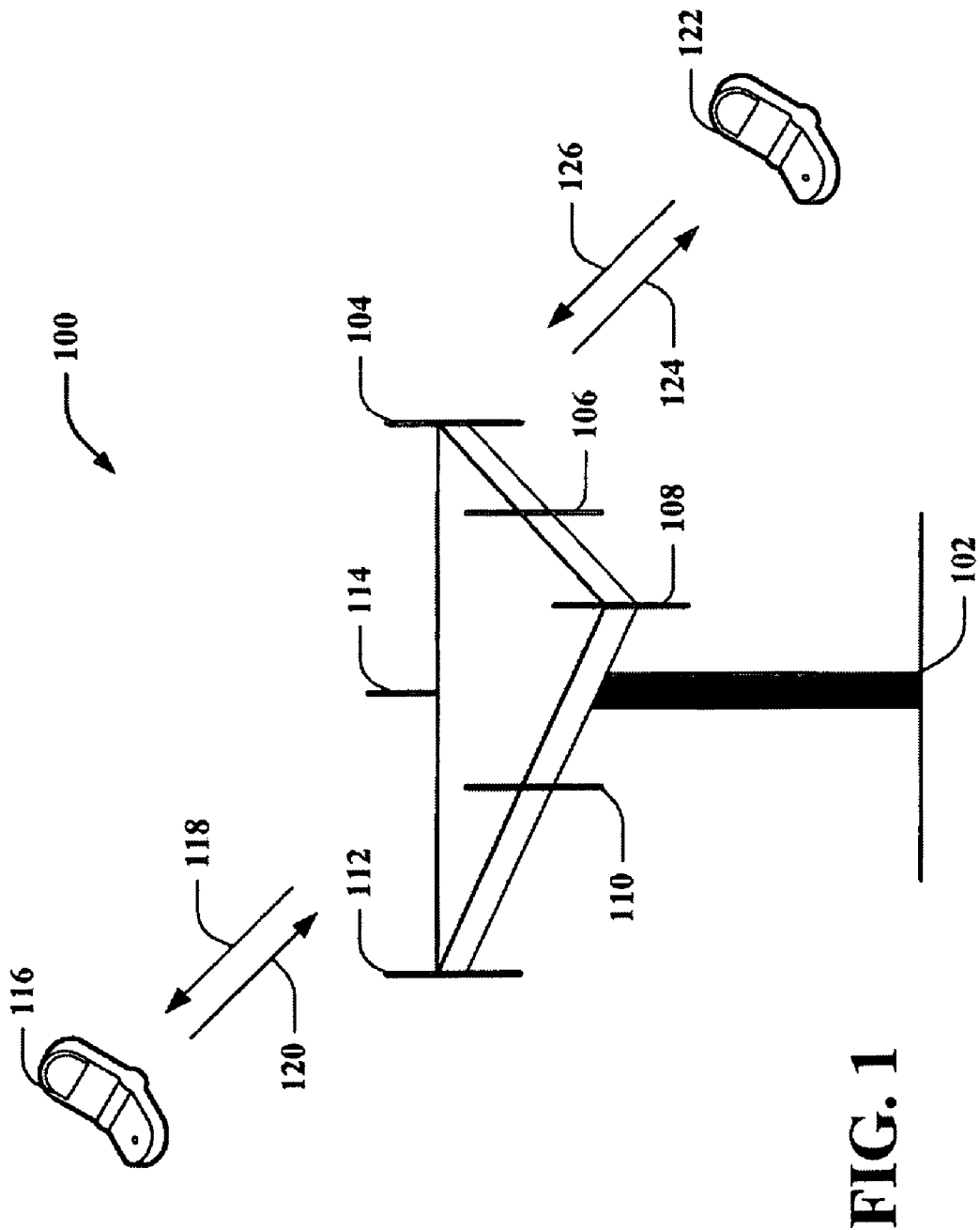
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

The claimed subject matter in accordance with an aspect provides architectures and methodologies for conveying circuit switched voice over packet switched air interfaces such as high speed packet access/enhanced uplink technologies.

Figure 2:
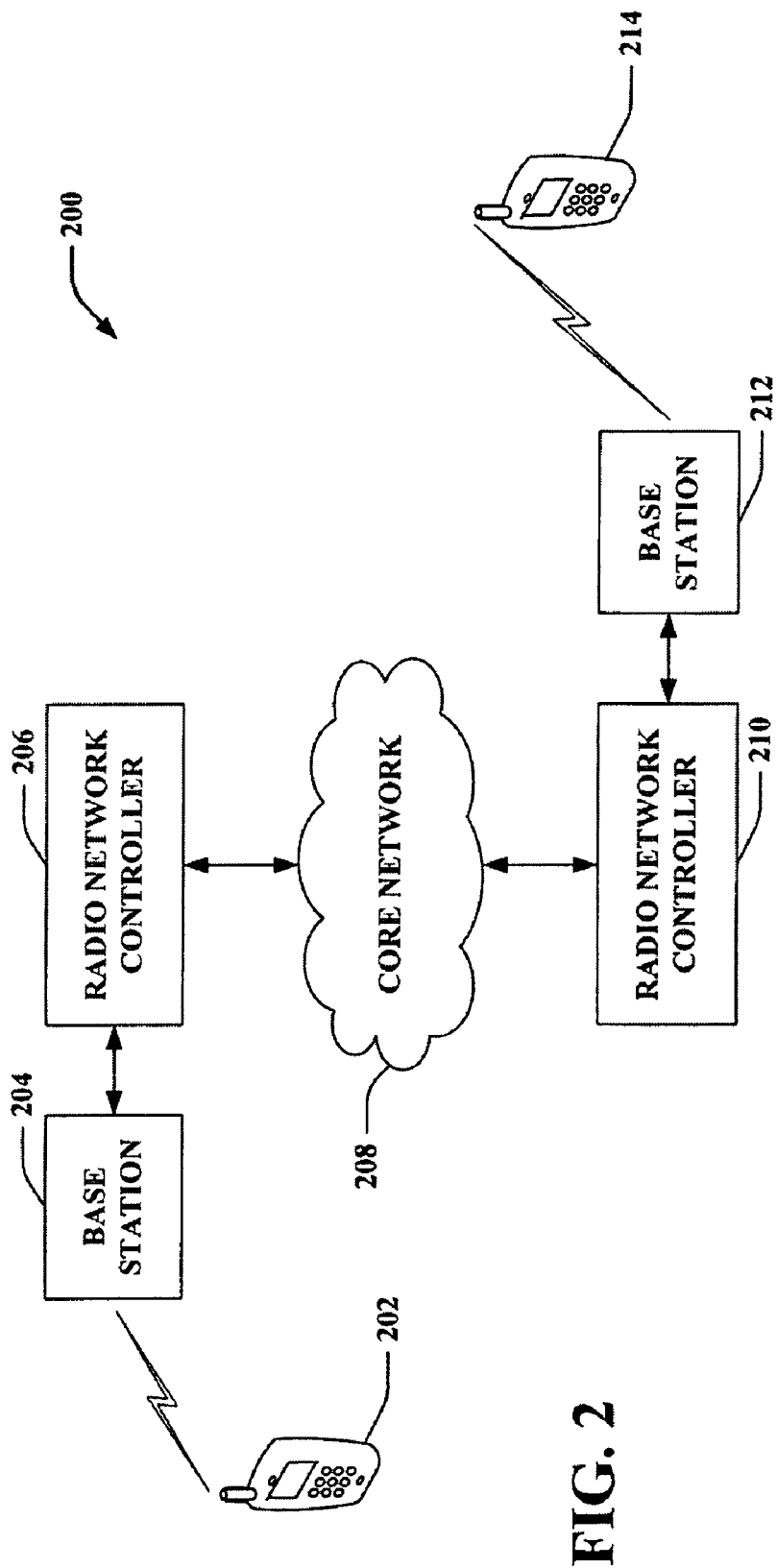
FIG. 2 is an illustration of an example system that effectuates transmitting circuit switched voice over packet switched networks in a wireless communication environment.

Turning now to FIG. 2 which provides depiction of an illustrative network architecture 200 that in accordance with an aspect facilitates and/or actuates carrying circuit switched packets (e.g., circuit switched voice packets) over a packet switched air interface. As illustrated system 200 can include access terminal 202 that can be in continuous and/or operative or sporadic and/or intermittent communication with base station 204 and/or with the greater cellular system or core network 208 (e.g., $3^{rd}$ Generation (3G) cellular systems) through facilities and functionalities provided by radio network controller 206. Access terminal 202, as exemplified above in context with access terminals 116 and 122, can be implemented entirely in hardware and/or a combination of hardware and/or software in execution. Further, access terminal 202 can be incorporated within and/or be associated with other compatible components. Additionally, access terminal 202 can be, but is not limited to, any type of machine that includes a processor and/or is capable of effective communication with core network 208. Illustrative machines that can comprise access terminal 202 can include desktop computers, cellular phones, smart phones, laptop computers, notebook computers, Tablet PCs, consumer and/or industrial devices and/or appliances, hand-held devices, personal digital assistants, multimedia Internet mobile phones, multimedia players, and the like.

Further as depicted, network architecture 200 can also include base station 204 that can provide improved interoperability between the cellular core network and local area IEEE 802 based networking (wired and/or wireless) environments typical in home and/or business environments, for instance. Moreover, base station 204 can provide for cellular system and/or network coverage extension to home or small enterprise networks, for example, and affords peak cellular throughput rates for individual users of a cellular network environment.

Additionally as exemplified in FIG. 2, network architecture 200 can further include radio network controller 206 that can be responsible for control of a set of one or more base stations (e.g., base station 204) which can be connected to, or grouped by, radio network controller 206. Radio network controller 206 typically carries out radio resource management (e.g., strategies and algorithms for controlling parameters such as transmit power, channel allocation, handover criteria, modulation scheme, error coding scheme, etc.), and some of the mobility management functions (e.g., keeping track of where access terminals/user equipment 202 is so that calls, text messaging through the short messaging service (SMS), and other disparate mobile services can be delivered to them). Moreover, radio network controller 206 is typically the point where encryption can be done before user data is sent to and from the access terminal/user equipment 202. Radio network controller 206 generally connects circuit switched core networks (e.g., core network 208) through media gateway servers (MGW) and/or mobile switching centers (MSC) to serving GPRS support nodes (SGSNs) (not shown) that can be responsible for delivery of packets from and to the access terminals/user equipment 202 situated within a particular geographical service area.

Additionally, network architecture 200, as alluded to above, can include core network 208 that can be a circuit switched network. Circuit switched networks typically are ones that establish fixed bandwidth circuits or channels between nodes and/or terminals (e.g., between access terminal/user equipment 202 and access terminal/user equipment 214) before users can communicate. Circuit switching provides the perception (e.g., by providing a constant or consistent bit delay) that the nodes and/or terminals are physically connected with one another via an electrical circuit. This is in contrast to packet switching, where factors such as packet queuing can cause varying delays leading to jitter, especially in the context of voice transmissions.

Furthermore as illustrated, network architecture 200 can additionally include radio network controller 210, base station 212, and access terminal/user equipment 214. Because much of the configuration and operation of the aforementioned components is substantially similar to those described with respect to access terminal/user equipment 202, base station 204, and radio network controller 206 explicated above, a detailed description of such features and functionalities has been omitted to avoid needless prolixity and for the sake of brevity and conciseness.

Figure 3:
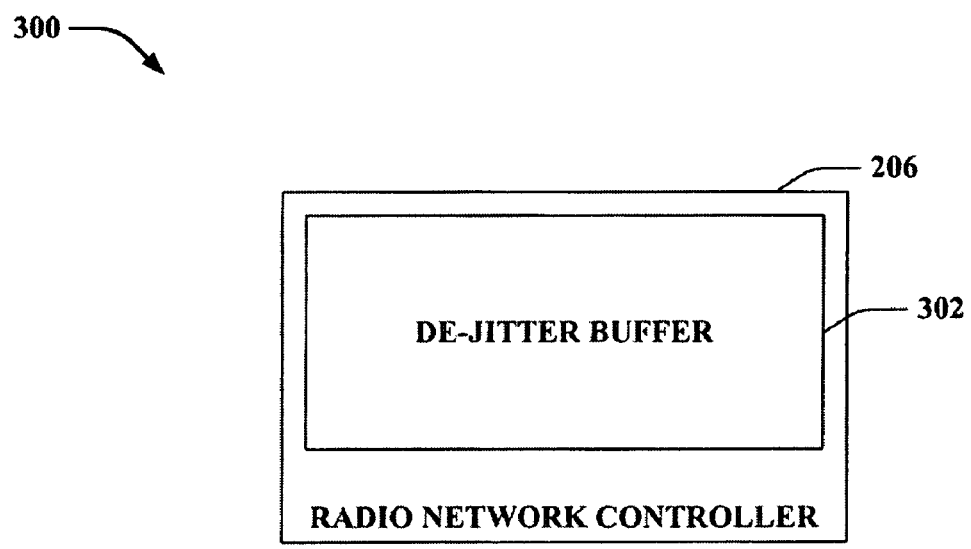
FIG. 3 is an illustration of an example system that actuates transmitting circuit switched voice over packet switched networks in a wireless communication environment.

FIG. 3 provides further and more detailed depiction of radio network controller 206 in accordance with various aspects of the claimed matter. As illustrated radio network controller 206 (and similarly radio network controller 210) can include de-jitter buffer 302 that can be employed when radio network controller 206 is being utilized in an uplink phase of communication (e.g., items 120 and 126 depicted in FIG. 1) with core network 208. In accordance with an aspect of the claimed matter, de-jitter buffer 302 can be employed to de-jitter packets (e.g., packet switched packets emanating from access terminal/user equipment 202 via base station 204) without necessarily decoding the oncoming packets. In a further aspect, de-jitter buffer 302 can delay forwarding the incoming packets onto core network 208 by a certain amount of time wherein the delay period can be dependent upon the maximum jitter generated attributable to utilization of fast data transmission protocols, such as hybrid automatic repeat request, (HARQ).

In accordance with further aspects of the claimed subject matter, de-jitter buffer 302 can utilize a fixed delay in order to accommodate jitter arising from utilizing hybrid automatic repeat request (HARQ) transmissions before forwarding packets onto core network 208. To provide illustration of how de-jitter buffer 302 can provide a fixed delay prior to conveying packets into core network 208, consider the following illustration. If it is assumed that the enhanced uplink transmit time interval is ten milliseconds (e.g., EUL TTI=10 ms), the maximum hybrid automatic repeat request (HARQ) transmission is set to two (e.g., HARQ transmissions=2), and spacing between transmissions is 40 ms, then the maximum transmission delay of a packet can be 50 ms (e.g., 10 ms+40 ms). Thus, if the first packet in a call initiated by access terminal/user equipment 202, decodes in the first HARQ attempt, then it sees a transmission delay of 10 ms, and de-jitter buffer 302 can delay forwarding the initial packet to core network 208 (e.g., to the mobile switching center/media gateway server (MSC/MGW)) by 40 ms (e.g., Maximum Transmission delay−Transmission Delay of $1^{st}$ packet (50 ms−10 ms)). Thereafter, subsequent packets from access terminal/user equipment 202 can, for example, be disseminated at intervals of 20 ms (or multiples of 20 ms, for discontinuous transmission (DTXed) frames) from the first packet.

If on the other hand the initial packet received from access terminal/user equipment 202 decodes in the second HARQ attempt, then this packet can see a delay of by 50 ms and should be delayed by 0 ms (e.g., Maximum Transmission delay−Transmission Delay of $1^{st}$ packet (50 ms−50 ms))—it should be forwarded immediately to core network 208. Thereafter, subsequent packets from access terminal/user equipment 202 can be forwarded on to core network 208 at intervals of 20 ms (or, once again, multiples of 20 ms for discontinuous transmission (DTXed) frames) from reception of the initial packet from access terminal/user equipment 202, for example.

Figure 4:
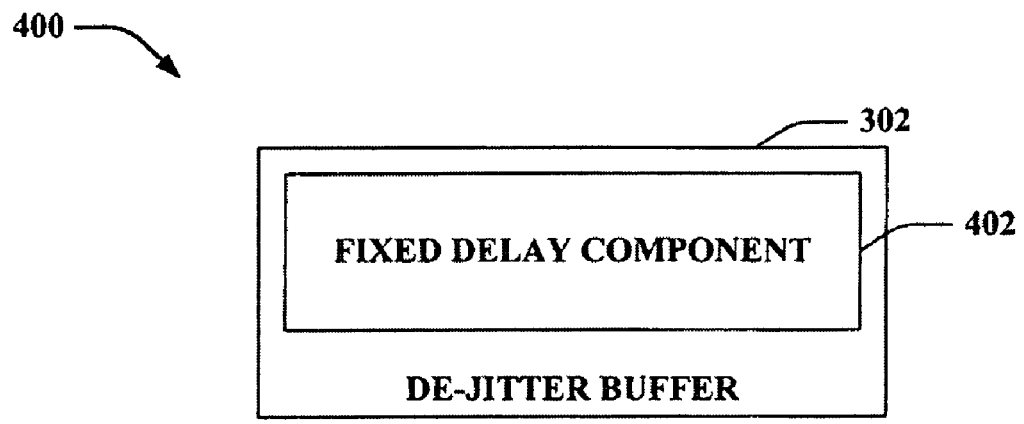
FIG. 4 is an illustration of an example de-jitter buffer that effectuates transmitting circuit switched voice over packet switched networks in accordance with various aspects of the subject disclosure.

FIG. 4 provides further illustration 400 of de-jitter buffer 302 in accordance with an aspect of the claimed subject matter. As illustrated, de-jitter buffer 302 can include fixed delay component 402 that ascertains the amount of delay that should be utilized before forwarding packets (e.g., voice packets) from access terminal/user equipment 202 via base station 204 to core network 208. Fixed delay component 402, based at least in part on previous knowledge or dynamic ascertainment regarding the maximum number of HARQ attempts and spacing separating the number of attempts, can establish a fixed delay period which can be utilized to forward received packets into core network 208. For instance, if there are a maximum of N HARQ attempts with a spacing of S milliseconds between each attempt, and where the first packet in a call emanating on the uplink from access terminal/user equipment 202 decodes in N1 HARQ attempts, the fixed delay component 402 can delay the initial packet by ((N−N1)*S) milliseconds. To provide a more concrete example, consider the situation where fixed delay component 402 operates on the understanding that the transmit time interval (TTI) is 2 ms with 4 maximum HARQ attempts with a spacing between attempts of 16 ms, if the first packet from access terminal/user equipment 202 is received and decoded at fixed delay component 402 in the second HARQ attempt, fixed delay component 402 can effectuate a delay of 32 ms (e.g., (4−2)*16=32 ms). Subsequent packets thereafter can be sent out at intervals of (or in the case of discontinuous transmission (DTXed) frames, multiples of) 20 ms, for example, from the first packet.

In order to handle discontinuous transmission (DTXed) frames a de-jitter buffer (e.g., de-jitter buffer 302) typically can use timestamp information carried or associated with the received packets. Accordingly, packets received after the first packet, for example, can be forwarded by de-jitter buffer 302 at time $T_1+((TS_n-TS_1)*20)$ milliseconds, where $T_1$ is the time of forwarding the first packet, $TS_1$ is the timestamp associated with the first packet, and $TS_n$ is the timestamp of the $n^{th}$ packet (assuming without limitation, for example, that the timestamp is scaled down to units of packets).

Figure 5:
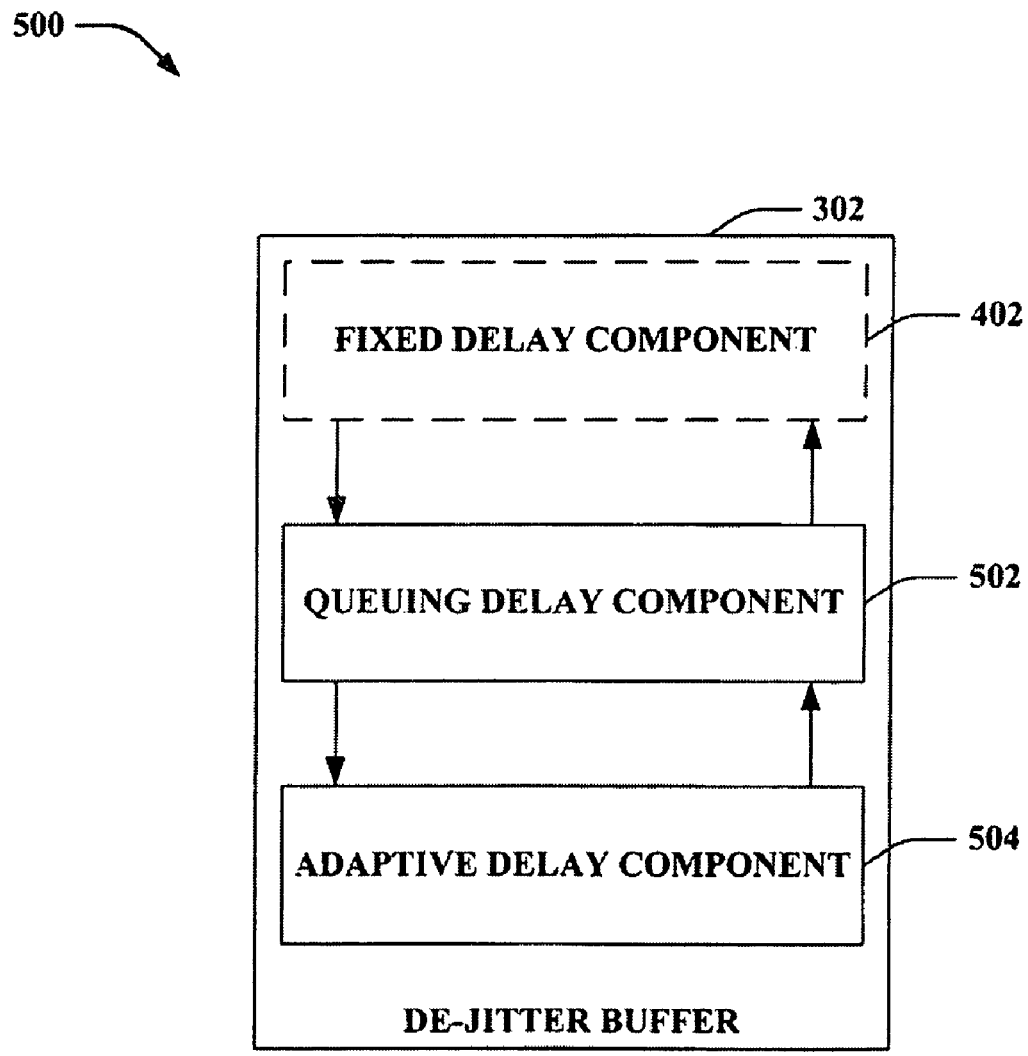
FIG. 5 is a further illustration of an example de-jitter buffer that effectuates transmitting circuit switched voice over packet switched networks in accordance with various aspects of the claimed disclosure.

FIG. 5 provides depiction 500 of further aspects associated with de-jitter buffer 302. De-jitter buffer 302, in addition to fixed delay component 402 the functionality of which has been expounded upon in relation to FIG. 4 above, can include queuing delay component 502 and adaptive delay component 504. In some instances, the worst delay experienced by a packet on the uplink from access terminal/user equipment 202 can be attributable to queuing delay in addition to transmission delay due to HARQ. Queuing delay, without limitation, can be experienced because of one or more of the following reasons: (1) if access terminal/user equipment 202 is, or becomes, power limited, then some packets can be fragmented (or split) to allow transmission of smaller packets which can require less transmission power to be expended by access terminal/user equipment 202—as will be appreciated by those cognizant in this field of endeavor, such fragmentation can nonetheless have an adverse knock on effect where subsequent packets become queued awaiting transmission; (2) when access terminal/user equipment 202 comes out of discontinuous transmission (DTX), the first packet can be subjected to queuing delay; (3) other traffic sources, such as signaling, can have higher priority than the packet to be transmitted.

In connection with packets being fragmented to allow for transmission of smaller packets by access terminal/user equipment 202, it should be noted without limitation, that when access terminal/user equipment 202 ascertains that it is power limited and needs to fractionate, subdivide, and/or partition packets, it can fractionize packets into multiple smaller sub-packets. For instance, access terminal/user equipment 202 can decide, because a power limitation has been detected, that it can only permissibly send half packets. Accordingly, access terminal/user equipment 202 can partition each packet into two parts and send to radio network controller 206 the first part at one instance in time and the second part at a second instance in time. It should noted, and as will be appreciated by those moderately conversant in this area of expertise, that packets that have been fragmented or sub-divided are only deemed complete when all the constituent components have been received and reconstructed by the radio network controller 206. Until such time that all the sub-packets have been successfully received, radio network controller 206 is unable to forward the "complete packet" into core network 208.

Further, with regard to packets being queued behind higher priority traffic sources this can be an extremely atypical situation as generally nothing has priority over the dissemination of voice packets. Nevertheless, where packets are delayed due to higher priority traffic, such as Session Initiation Protocol (SIP) (e.g., a protocol typically employed for setting up and tearing down multimedia communication sessions), there can be delays due to these other factors. For example, access terminal/user equipment 202 can send Session Initiation Protocol (SIP) packets before voice packets in which case the voice packets can back up and be queued.

Accordingly, queuing delay component 502 can either mitigate queuing delays by identifying delays attributable to queuing issues and automatically and/or dynamically providing adjustments to account for such delay, or can ignore such delays which can lead to some minor degradation in the quality of voice being propagated.

For some network operators (e.g., operators of core network 208) degradation in the quality of voice transmissions is not an issue but for other operators it can be a matter of paramount importance. Thus, de-jitter buffer 302 can also include adaptive delay component 504 that actuates adaptive de-jittering wherein the de-jitter buffer is automatically or dynamically adapted to maintain a certain underflow rate defined as the rate of arrival of packets later than the time at which they should or would have been forwarded into core network 208, or more particularly, conveyed to the mobile switching center/media gateway server (MSC/MGW). Adaptive delay component 504 can automatically or dynamically adapt the de-jitter buffer during "silence intervals" (e.g., when a voice encoder (vocoder) is generating Silence Insertion Description (SID)/Discontinuous transmission (DTX) frames—frames used to convey acoustic background information during discontinuous transmission (DTX) and inserted during periods of non active speech). The difference between the transmission delay of the first packet and the maximum transmission delay (as employed by fixed delay component 402, above) can be used by adaptive delay component 504 as an initial setting for the delay.

To provide further elucidation of the functionality of adaptive delay component 504, consider the following example. If the first packet is received from access terminal/user equipment at 10 ms and de-jitter buffer 302 waits for 40 ms the first packet can be sent into core network 208 at 50 ms on the expectation that a second packet should arrive at or before 70 ms. However, if for reasons stated above in connection with queuing delay component 502, the second packet is not forthcoming by 70 ms (e.g., the second packet arrives at some point after the 70 ms deadline) de-jitter buffer 302 can send indication to core network 208 that the second packet is has not been received. Core network 208 on receiving such an indication from de-jitter buffer 302 can interpret this as emblematic of a lost packet. To militate against this occurrence adaptive delay component 504 can keep track of all packets that transition through de-jitter buffer 302 and that are late. Adaptive delay component 504 can then determine the percentage or probability of packets arriving late and based at least in part in the percentage or probability of packets arriving late can perform some adaptation to the de-jitter buffer. For instance, adaptive delay component 504 can implement a policy wherein no more than 0.1% of packets can arrive later than the maximum time and based on this policy adaptive delay component 504 can cause de-jitter component 302 to ameliorate the jitter.

Figure 6:
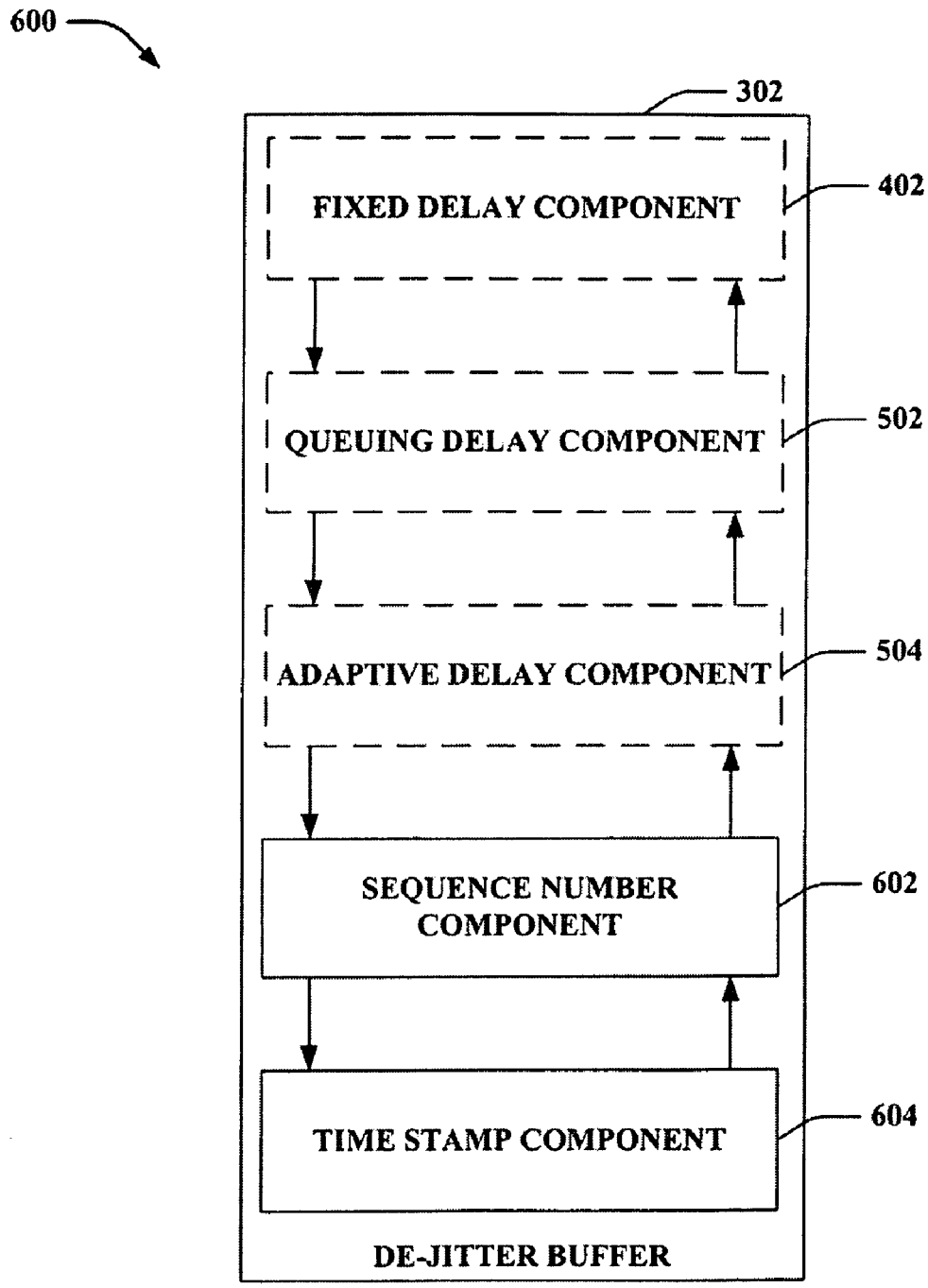
FIG. 6 provide further depiction of an example de-jitter buffer actuates transmitting circuit switched voice over packet switched networks in accordance with various aspects of the claimed subject matter.

FIG. 6 provides yet further illustration 600 of additional aspects associated with de-jitter buffer 302. De-jitter buffer 302, as an adjunct to fixed delay component 402, queuing delay component 502, and adaptive delay component 504, the attributes, versatility, and functionality of which have been explicated in connection with FIG. 4 and FIG. 5 above, can include sequence number component 602 and time stamp component 604. As will be appreciated by those reasonably cognizant in this field of endeavor, circuit switched packets (e.g., voice packets) can in some instances be carried in a synchronous-like manner over high speed packet access protocols (HSPA), and in other instances, circuit switched packets can be carried at regular intervals over high speed packet access (HSPA) modalities, such that it can be possible to uniquely determine the frame number from the time of arrival of the frame. Where circuit switched packets are carried at regular intervals over high speed packet access (HSPA) modalities/protocols signaling an adaptive multi rate (AMR) frame type can be employed. Under this conception a new packet data convergence protocol (PDCP) protocol data unit (PDU) types can be defined that can carry the adaptive multi rate (AMR) frame type, using unused packet identifier (PID) values for existing packet data convergence protocol (PDCP) protocol data unit (PDU) types, or implicitly through the packet size of the received frame. Under the foregoing scenario and example (e.g., in relation to conveying circuit switched packets at regular intervals over high speed packet access (HSPA) protocols), utilization of de-jitter buffer 302 may not be necessary.

Returning now to the main thrust of the discussion, there nevertheless can be instances where circuit switched packets are carried with jitter with some real time protocol (RTP) functionality provided by carrying sequence numbers, and where discontinuous transmission (DTX) frames are transmitted over-the-air. In this instance, circuit switched packets can be carried with jitter over HSPA, and discontinuous transmission (DTXed) frames can be indicated by sending "No Data" adaptive multi-rate (AMR) frames. In accordance with an aspect therefore, there can be a need to signal or indicate the adaptive multi-rate (AMR) frame type. This indication can be provided by defining a new packet data convergence protocol (PDCP) protocol data unit (PDU) type that can, for example, carry the adaptive multi-rate (AMR) frame type. Where this is the case, de-jitter buffer 302 associated with radio network controller (RNC) 206 uplink can be utilized. Additionally, a de-jitter buffer, similar to that detailed and dissertated upon herein in relation to de-jitter buffer 302, can be affiliated with and utilized by access terminals/user equipment (e.g., access terminals/user equipment 116, 122, 202 and 214). To allow operation of the de-jitter buffer under this mode of operation de-jitter buffer 302 needs, for example, to be apprised of the sequence number of speech frames. The functionality of providing indication to de-jitter buffer 302 of the sequence number of the frames can be effectuated by sequence number component 602. Sequence number component 602 therefore can actuate provision of sequence numbers associated with frames by conveying to de-jitter buffer 302 the radio link control (RLC) layer sequence number, or dispatching to de-jitter buffer 302 a new sequence number introduced into the packet data convergence protocol (PDCP) protocol data unit (PDU). It should be noted that under this aspect of the claimed matter discontinuous transmission (DTXed) frames can be transmitted, potentially as adaptive multi-rate (AMR) "No Data" frames (e.g., frame type=15), and that voice capacity can, but is not necessarily limited to, be less than the maximum possible.

Further there can be instances where circuit switched packets can be carried with jitter with some real time protocol (RTP) functionality provided by carrying sequence numbers, and where discontinuous transmission (DTX) frames are not transmitted over-the-air. In this eventuality, circuit switched packets (e.g., voice packets) can be carried with jitter over HSPA and discontinuous transmission (DTXed) frames are not sent over the air. In accordance with an aspect of the claimed matter therefore, there can be a requirement that indication of the adaptive multi-rate (AMR) frame type be provided. Such indication can be provided by defining a new packet data convergence protocol (PDCP) protocol data unit (PDU) type that can carry the adaptive multi-rate (AMR) frame type. Further, due to the fact that discontinuous transmission (DTXed) frames are not sent over the air, maximum voice capacity can be achieved. In order to effectuate this aspect of the claimed matter, de-jitter buffer 302 associated with the uplink radio network controller 206 can be deployed. Moreover, a de-jitter buffer similar to that utilized by radio network controller 206 can be employed by access terminal/user equipment 202. To allow operation of de-jitter buffer 302 under this mode of operation de-jitter buffer 302 requires indication of the sequence number of the speech frame. This functionality can be provided to de-jitter buffer 302 by sequence number component 602 by dispatching the sequence number associated with the radio link control layer (RLC), or additionally and/or alternatively, by conveying a new sequence number added to the packet data convergence protocol (PDCP) protocol data unit (PDU). Moreover, since discontinuous transmission (DTXed) frames are not sent over-the-air, de-jitter buffer 302 can require time stamp information in some instances to differentiate between erased and discontinuous transmission (DTXed) frames. Such time stamp information can be provided by time stamp component 604. It should be noted that where time stamp information is not utilized or incorporated in a time stamp field associated with the packet data convergence protocol (PDCP) protocol data unit (PDU), voice quality can be slightly lower in some cases than the best possible.

Moreover, there can be instances where circuit switched packets can be carried with jitter with real time protocol (RTP) functionality provided by carrying both sequence numbers and time stamp information, and where discontinuous transmission (DTX) frames are not transmitted over-the-air. Under this conception of the claimed matter, circuit switched packets (e.g., circuit switched voice packets) can be conveyed with jitter over HSPA and discontinuous transmission (DTXed) frames are not set over the air. The distinguishing feature of this aspect, as opposed to aspects disclosed above, lies in the fact that time stamp data is additionally conveyed in the real time protocol (RTP) header in addition to packet sequence numbers. In accordance with this aspect of the claimed subject matter, there can be a necessity that notification of the adaptive multi-rate (AMR) frame type be provided. Typically, such information can be supplied by defining a new packet data convergence protocol (PDCP) protocol data unit (PDU) type that can convey the adaptive multi-rate (AMR) frame type. Due to the fact that discontinuous transmission (DTXed) frames are not generally transmitted over the air under this conception of the claimed matter, maximum voice capacity can be achieved. In order to effectuate this aspect of the claimed matter, de-jitter buffer 302 associated with the uplink radio network controller 206 needs to be apprised of packet sequence numbers. Such packet sequence number can be obtained from the radio link control (RLC) layer sequence numbers, or additionally and/or alternatively, new sequence numbers can be generated by sequence number component 602 and thereafter added to the packet data convergence protocol (PDCP) protocol data unit (PDU). Moreover, since discontinuous transmission (DTXed) frames are not generally sent over the air, de-jitter buffer 302 can utilized time stamp information generated by time stamp component 604 and included in the packet data convergence protocol (PDCP) protocol data unit (PDU) to differentiate between erased and discontinuous transmission (DTXed) frames.

As will be appreciated and apparent to those reasonably skill in the art variant aspects of the foregoing described aspects can be implemented without departing from the intent and scope of the claimed subject matter. For example, in aspects discussed above wherein sequence numbers are transmitted, such transmission need not be over the air, rather base station 204 (or a Node B) can communicate this information to radio network controller 206 whenever it detects an erased frame. Such a policy can avoid the need to transmit the sequence number over the air, for example.

Additionally, as will be appreciated by those of ordinary skill in the art real time protocol (RTP) headers typically provide two bytes for sequence numbers and four bytes for time stamp information. Nevertheless, the sizes of the sequence number and the time stamp fields conveyed in any of the aspects expounded upon above can be smaller (e.g., need not be as large) or larger. For example, in accordance with an aspect of the claimed subject matter, if sequence number and time stamp information are added, one byte utilized for the sequence number and one byte employed for the time stamp can be sufficient to effectuate the explicated aspects and variations thereof.

Furthermore, as will also be appreciated by individuals conversant in this area of expertise, over a circuit switched air-interface, adaptive multi-rate (AMR) bits can be classified as Class A, B, or C bits, and these bits can be provided to unequal error protection (UEP). Where this is the case, for carrying circuit switched voice packets over high speed packet access links, there generally is not a necessity to classify adaptive multi-rate (AMR) bits into different classes.

Moreover, it should be noted that in the aspects disclosed and explicated above and any variants thereof, sequence numbers and/or time stamp information can be carried end-to-end instead of per link.

Figure 7:
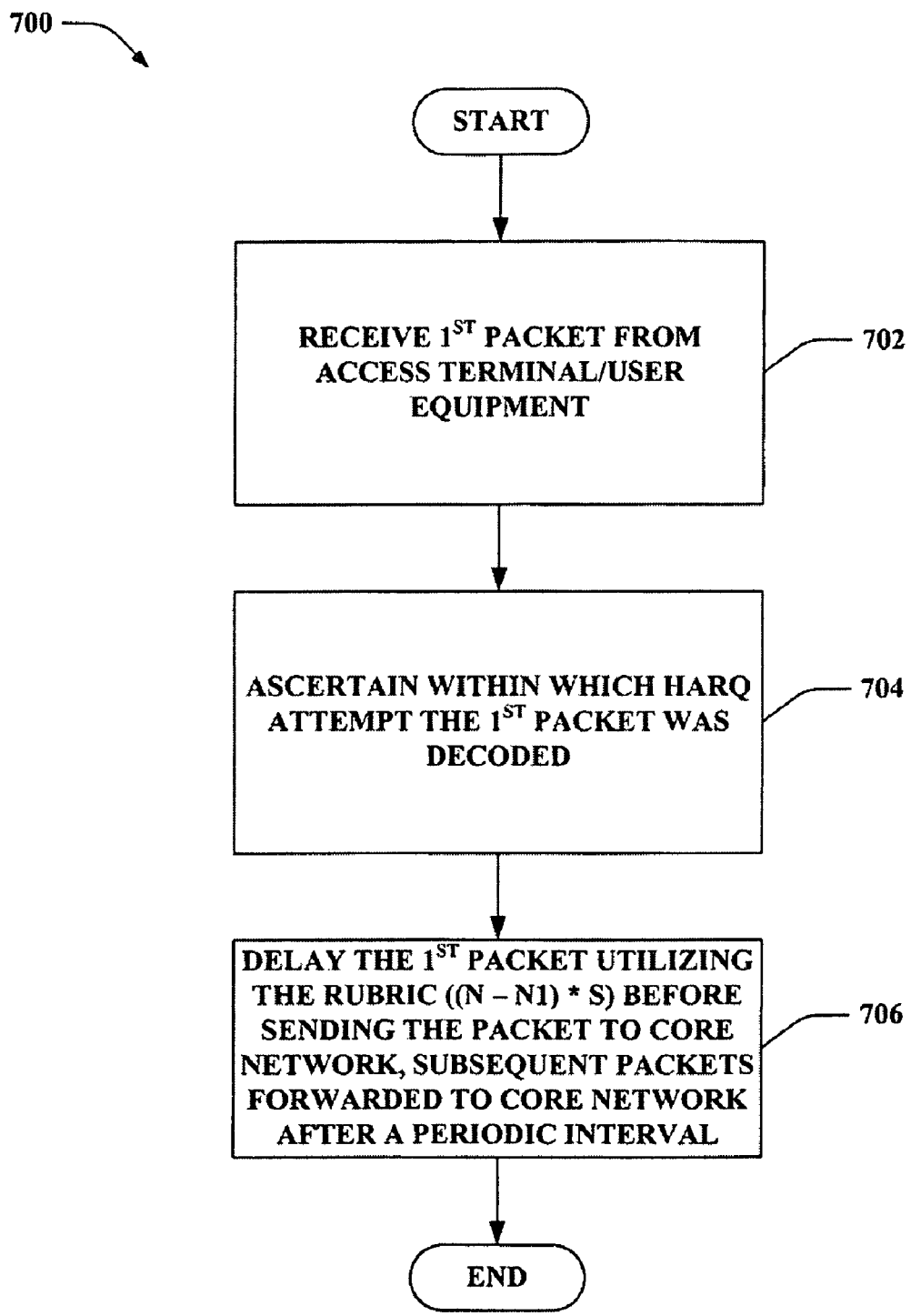
FIG. 7 is an illustration of an example methodology that facilitates transmission of circuit switched voice over packet switched networks in a wireless communication environment.

Referring to FIG. 7, a methodology relating to transmitting circuit switched voice over packet switched networks is illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 7, illustrated is a methodology 700 that facilitates transmitting circuit switched voice over packet switched networks in accordance with an aspect of the claimed subject matter. Methodology 700 can commence at 702 where a first packet (voice packet) can be received from an access terminal. At 704 a determination can be made as to within which HARQ attempt the received packet was decoded. At 706 the first packet can be delayed for an ascertainable period of time wherein the period of time is determined using the rubric $((N-N1)*S)$ where N denotes the maximum number of HARQ attempts that by previous consensus has been agreed upon for utilization, S connotes a spacing of time between the N HARQ attempts, and N1 indicates within which HARQ attempt the packet was decoded. For instance, where there is a 2 ms transmit time interval (TTI) with a maximum of 4 HARQ attempts and a spacing of 16 ms, and where the first packet decodes in the second HARQ attempt, then a delay of 32 ms $((4-2)*16)$ can be instituted or imposed on the forwarding of the first packet. All subsequent packets received thereafter from access terminal/user equipment can be forwarded or conveyed to the core network at pre-established or dynamically determined periodic intervals thereafter (e.g., every 20 ms, or multiples thereof).

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
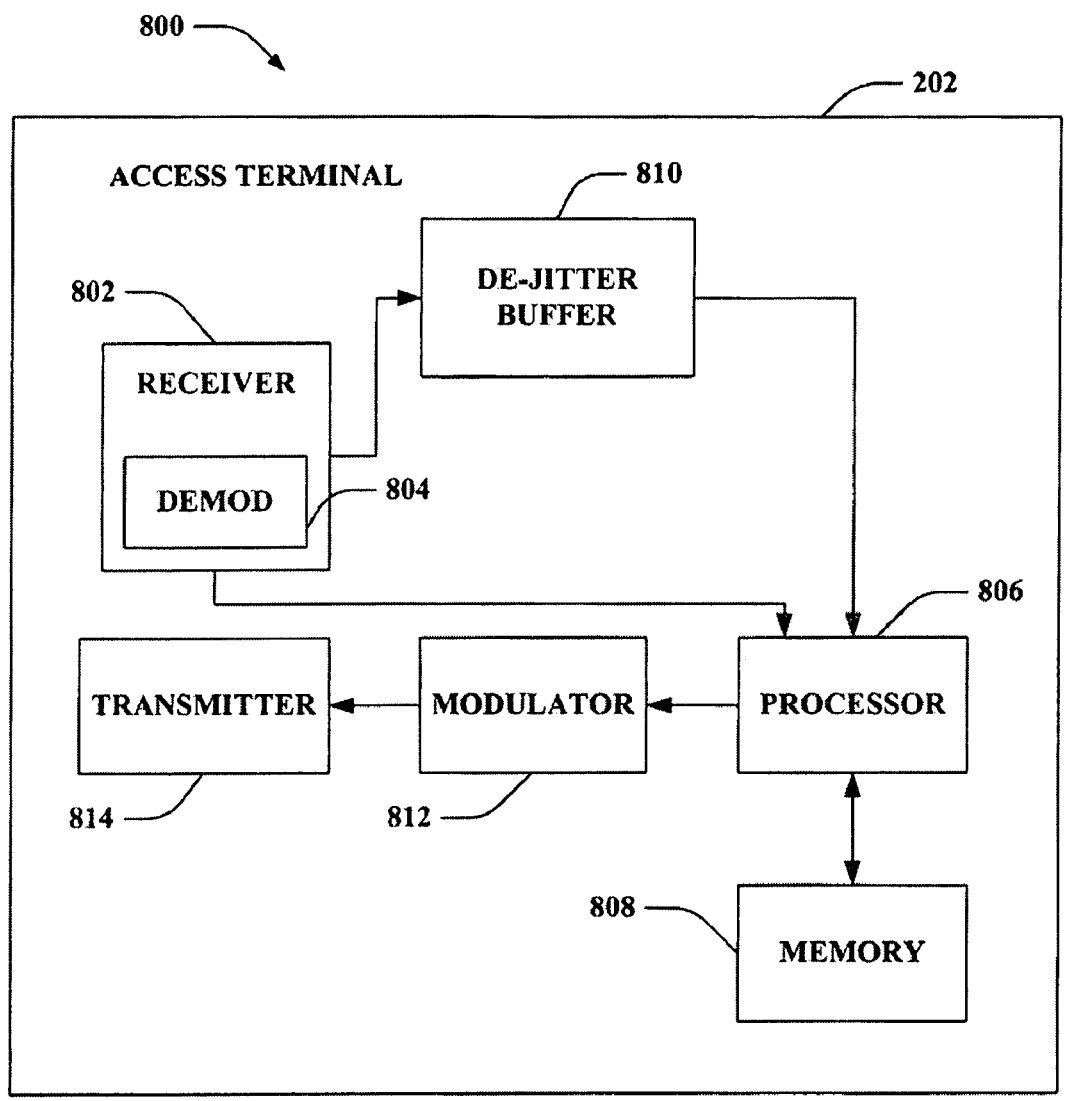
FIG. 8 is an illustration of an example access terminal that effectuates transmitting circuit switched voice over packet switched networks in a wireless communication system.

FIG. 8 is an illustration 800 of an access terminal 202 that facilitates transmitting circuit switched voice over packet switched networks. Access terminal 202 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 814, a processor that controls one or more components of access terminal 202, and/or a processor that both analyzes information received by receiver 802, generates information for transmission by transmitter 814, and controls one or more components of access terminal 202.

Access terminal 202 can additionally comprise memory 808 that is operatively coupled to processor 806 and that can store data to be transmitted, received data, and any other suitable information related to performing the various actions and functions set forth herein. For instance, memory 808 can store group-specific signaling constraints employed by one or more base stations. Memory 808 can additionally store protocols and/or algorithms associated with identifying signaling constraints used for communicating resource block assignments and/or employing such signaling constraints to analyze received assignment messages.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to a de-jitter buffer 810 which can be substantially similar to de-jitter buffer 302 of FIG. 3. De-jitter buffer 810 can be employed to facilitate transmission of circuit switched voice over packet switched networks. Access terminal 202 still further comprises a modulator 812 and a transmitter 814 that transmits the signal to, for instance, a base station, another access terminal, etc. Although depicted as being separate from the processor 806, it is to be appreciated that de-jitter buffer 810 and/or modulator 812 can be part of processor 806 or a number of processors (not shown).

Figure 9:
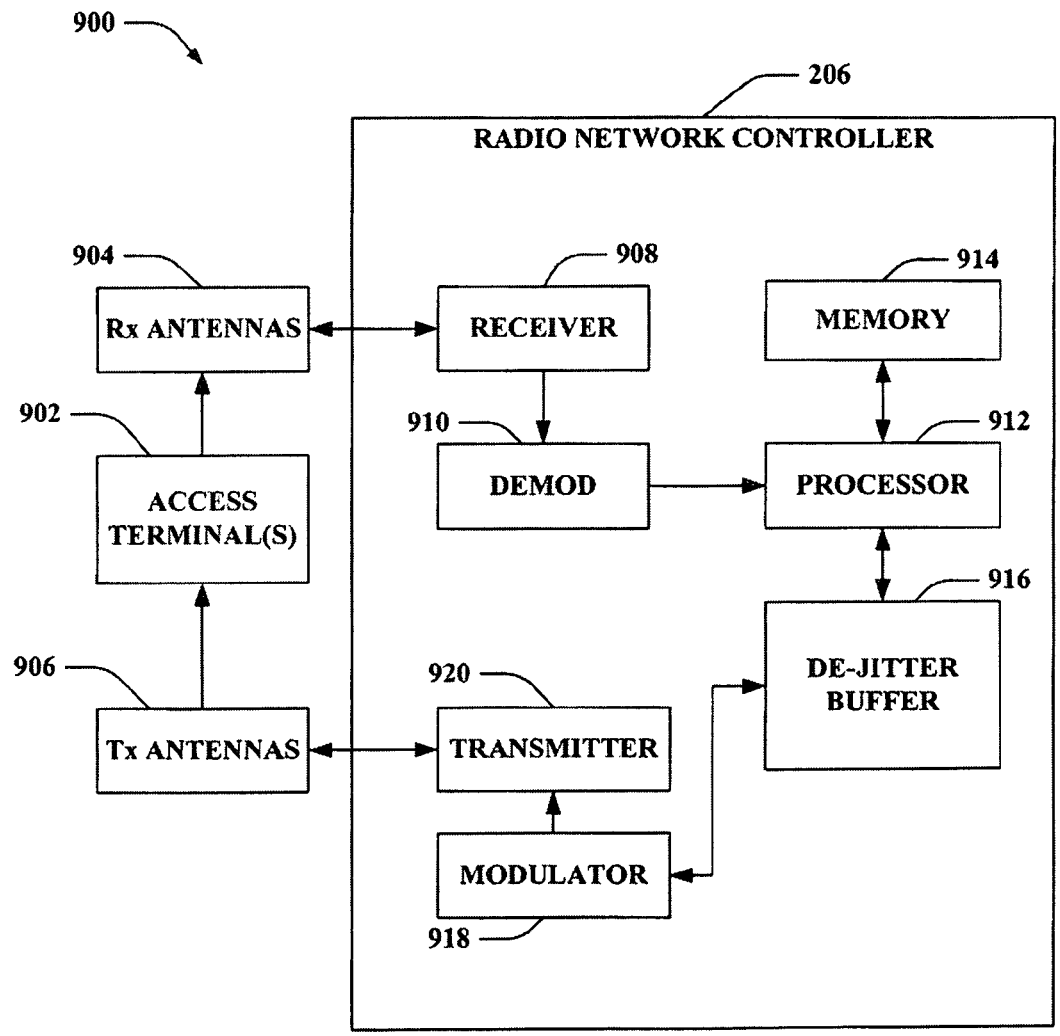
FIG. 9 is an illustration of an example system that effectuates transmitting circuit switched voice over packet switched networks in a wireless communication environment.

FIG. 9 is an illustration of a system 900 that facilitates transmitting circuit switched voice over packet switched networks. System 900 comprises a radio network controller 206 (e.g., access point, . . . ) with a receiver 908 that receives signal(s) from one or more access terminals 902 through a plurality of receive antennas 904, and a transmitter 920 that transmits to the one or more access terminals 902 through a transmit antenna 906. Receiver 908 can receive information from receive antennas 904 and is operatively associated with a demodulator 910 that demodulates received information. Demodulated symbols are analyzed by a processor 912 that can be similar to the processor described above with regard to FIG. 8, and which is coupled to a memory 914 that stores data to be transmitted to or received from access terminal(s) 902 (or a disparate base station (not shown)) and/or any other suitable information related to performing the various actions and functions set forth herein. Processor 912 is further coupled to a de-jitter buffer 916 that facilitate transmission of circuit switched voice over packet switched networks. Further, de-jitter buffer 916 can provide information to be transmitted to a modulator 918. Modulator 918 can multiplex a frame for transmission by a transmitter 920 through antennas 906 to access terminal(s) 902. Although depicted as being separate from the processor 912, it is to be appreciated that de-jitter buffer 916 and/or modulator 918 can be part of processor 912 or a number of processors (not shown).

Figure 10:
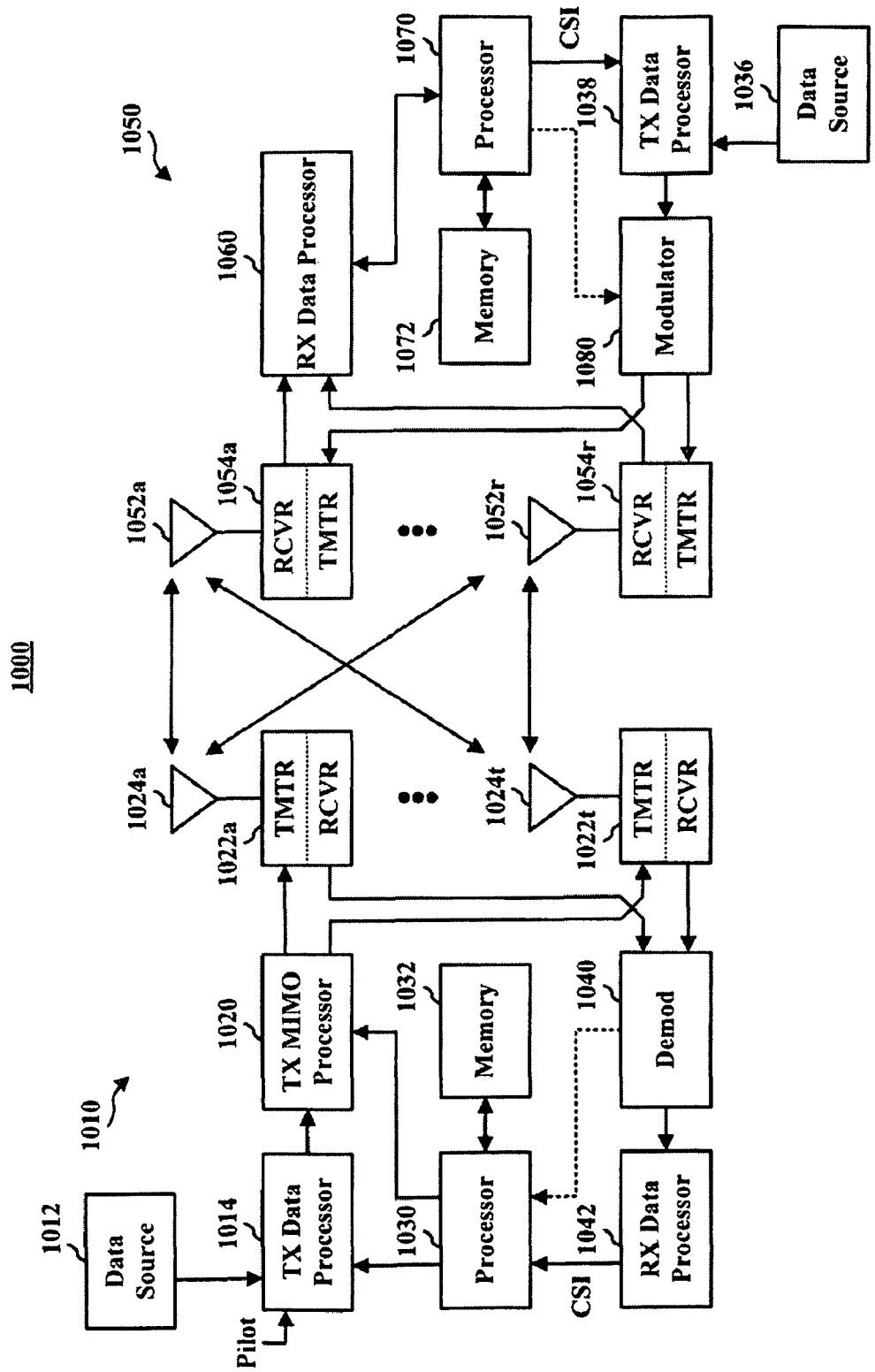
FIG. 10 is an illustration of an example wireless network environment that can be employed in conjunction with the various systems and methods described herein.

FIG. 10 shows an example wireless communication system 1000. The wireless communication system 1000 depicts one base station 1010 and one access terminal 1050 for sake of brevity. However, it is to be appreciated that system 1000 can include more than one base station and/or more than one access terminal, wherein additional base stations and/or access terminals can be substantially similar or different from example base station 1010 and access terminal 1050 described below. In addition, it is to be appreciated that base station 1010 and/or access terminal 1050 can employ the systems (FIGS. 1-6) and/or method (FIG. 7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides NT modulation symbol streams to NT transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1022a through 1022t are transmitted from NT antennas 1024a through 1024t, respectively.

At access terminal 1050, the transmitted modulated signals are received by NR antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the NR received symbol streams from NR receivers 1054 based on a particular receiver processing technique to provide NT "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from access terminal 1050 are received by antennas 1024, conditioned by receivers 1022, demodulated by a demodulator 1040, and processed by a RX data processor 1042 to extract the reverse link message transmitted by access terminal 1050. Further, processor 1030 can process the extracted message to determine which precoding matrix to use for determining the beamforming weights.

Processors 1030 and 1070 can direct (e.g., control, coordinate, manage, etc.) operation at base station 1010 and access terminal 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
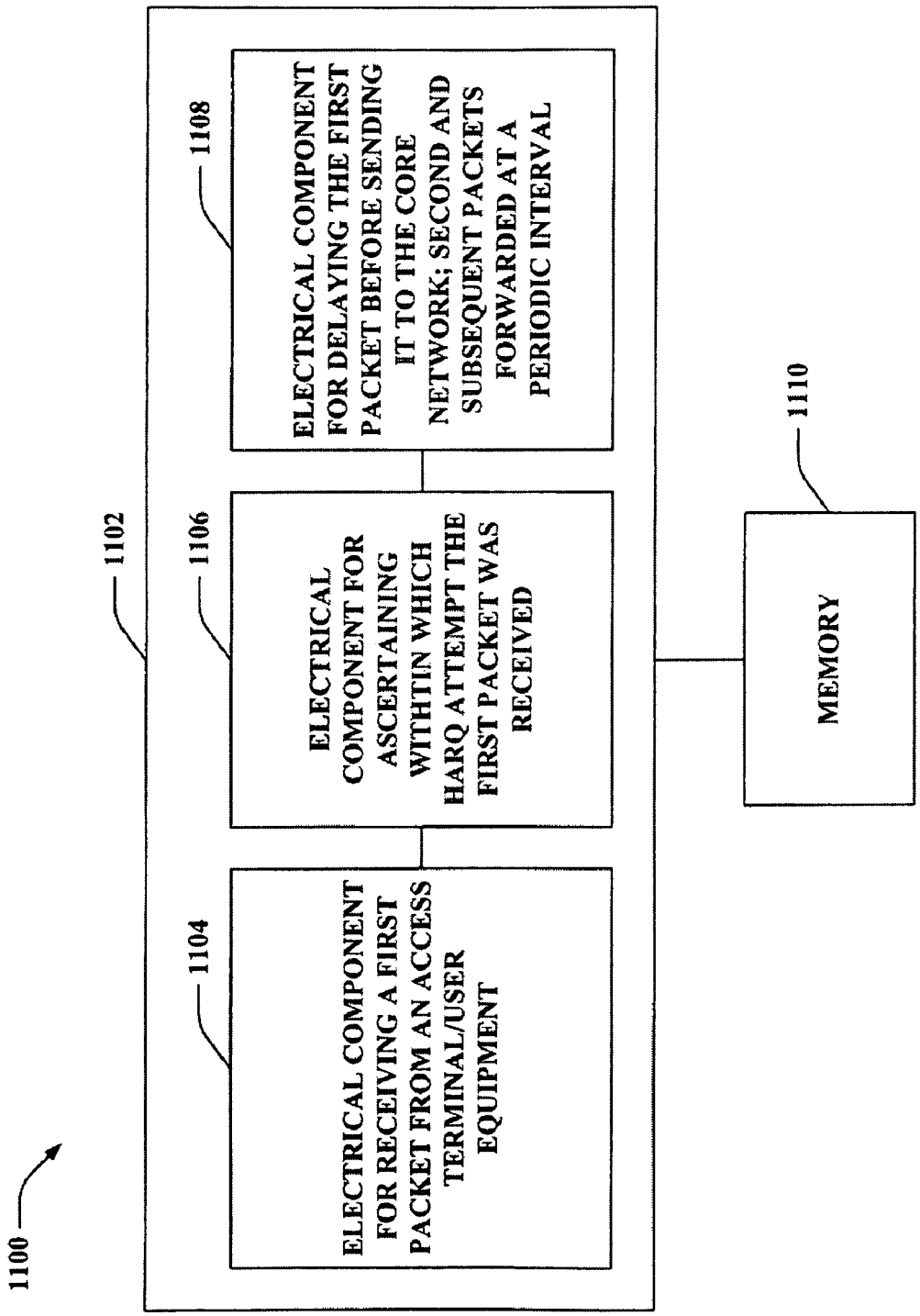
FIG. 11 is an illustration of an example system that effectuates transmitting circuit switched voice over packet switched networks in a wireless communication environment.

Turning to FIG. 11, illustrated is a system 1100 that enables utilizing a radio network controller in a wireless communication environment. System 1100 can reside within a radio network controller, for instance. As depicted, system 1100 includes functional blocks that can represent functions implemented by a processor, software, or combination thereof (e.g., firmware). System 1100 includes a logical grouping 1102 of electrical components that can act in conjunction. Logical grouping 1102 can include an electrical component for receiving a first packet from an access terminal/user equipment 1104. Further, logical grouping 1102 can include an electrical component for ascertaining within which HARQ attempt the first packet was received 1106. Moreover, logical grouping 1102 can include an electrical component for delaying the first packet before sending it onto the core network; second and subsequent packets being forwarded into the core network at established periodic intervals 1108. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that effectuates transmission of circuit switched voice over packet switched networks, comprising:
receiving a first packet originating from an access terminal;
determining within which hybrid automatic repeat request (HARQ) the first packet is received;
ascertaining an amount of delay that is applied to the first packet before the first packet is forwarded into a core circuit switched network; and
establishing a periodic time interval based at least in part on the amount of delay within which to convey subsequent packets originating from the access terminal, wherein the ascertaining further comprising utilizing a product of a difference between a maximum number of hybrid automatic repeat requests (HARQs) and the hybrid automatic repeat request (HARQ) within which the first packet is received and a spacing interval established between the maximum number of hybrid automatic repeat requests (HARQs).

2. The method of claim 1, the ascertaining further comprising determining the amount of delay to apply to the first packet without decoding the first packet.

3. The method of claim 1, the periodic time interval within which subsequent packets originating from the access terminal are delayed dependent on a maximum jitter attributable to utilization of fast data transmission protocols.

4. The method of claim 1, further comprising identifying discontinuous transmission (DTXed) frames by extracting timestamp information included in a header associated with the first packet or the subsequent packets originating from the access terminal.

5. The method of claim 1, further comprising identifying fragmented packets attributable to the first packet or the subsequent packets originating from the access terminal or delaying conveyance of the first packet or the subsequent packets to the core circuit switched network until all fragmented packets attributable to the first packet or the subsequent packets have been received or reconstituted.

6. The method of claim 1, further comprising adaptively delaying conveyance of the first packet or the subsequent packets to the core circuit switched network to maintain an underflow rate established as a rate of arrival of packets later than a time at which the first packet or the subsequent packets are to be conveyed to the core circuit switched network, where the adaptively delaying conveyance of the first packet or the subsequent packets based at least in part on an initial delay established based at least in part on a difference between a transmission delay of the first packet and a product of a difference between a maximum number of hybrid automatic repeat requests (HARQs) and the hybrid automatic repeat request (HARQ) within which the first packet is received and a spacing interval established between the maximum number of hybrid automatic repeat requests (HARQs).

7. The method of claim 1, further comprising sending indication to the core circuit switched network where subsequent packets are not received within the periodic time interval within which to convey subsequent packets originating from the access terminal.

8. A wireless communication apparatus that effectuates transmission of circuit switched voice over packet switched networks, comprising:
   means for receiving a first packet originating from an access terminal;
   means for determining within which hybrid automatic repeat request (HARQ) the first packet is received;
   means for ascertaining, based on a product of a difference between a maximum number of hybrid automatic repeat requests (HARQs) and the hybrid automatic repeat request (HARQ) within which the first packet is received and a spacing interval established between the maximum number of hybrid automatic repeat requests (HARQs) an amount of delay that is applied to the first packet before the first packet is forwarded into a core circuit switched network; and
      means for establishing a periodic time interval within which to convey subsequent packets originating from the access terminal.

9. The wireless communications apparatus of claim 8, further comprising means for determining whether the first packet that is carried at regular intervals utilizes at least one of a high speed uplink packet access protocol or a high speed downlink packet access protocol.

10. The wireless communications apparatus of claim 8, wherein a frame number associated with the first packet is determinable based at least in part on a time of arrival of a frame associated with the first packet or the frame number of the first packet is identified based at least in part on a limitation imposed on a maximum number of hybrid automatic repeat requests (HARQs).

11. The wireless communications apparatus of claim 8, wherein the first packet signals an adaptive multi-rate (AMR) frame type included in a newly defined packet data convergence protocol (PDCP) protocol data unit (PDU) that employs at least one of an unused packet identifier (PID) for an existing packet data convergence protocol (PDCP) protocol data unit (PDU) or a packet size of a received frame.

12. The wireless communications apparatus of claim 8, further comprising means for determining whether the first packet is carried with jitter and with real time protocol (RTP) functionality provided by carrying a sequence number.

13. The wireless communications apparatus of claim 8, further comprising ascertaining whether the first packet is carried with jitter by utilizing one or more of a high speed uplink access protocol or a high speed download packet access protocol where discontinuous transmission (DTXed) frames are indicated by sending a No Data adaptive multi-rate (AMR) frame, and an adaptive multi-rate (AMR) frame type associated with the first packet or the subsequent packets is indicated in a newly defined packet data convergence protocol (PDCP) protocol data unit (PDU) type.

14. The wireless communications apparatus of claim 8, further comprising determining whether the first packet and subsequent packets are conveyed with jitter utilizing a high speed packet access protocol wherein discontinuous transmission (DTXed) frames are not transmitted over-the-air, the first packet and the subsequent packets are conveyed with real time protocol (RTP) functionality provided by carrying a sequence number and a timestamp, the timestamp is utilized to differentiate between an erased frame and a discontinuous transmission (DTXed) frame, or the timestamp is included in a newly defined packet data convergence protocol (PDCP) protocol data unit (PDU) type that carries an adaptive multi-rate (AMR) frame type.

15. A wireless communications apparatus, comprising:
   a memory that retains instructions related to receiving a first packet originating from an access terminal, determining within which hybrid automatic repeat request (HARQ) the first packet is received, ascertaining an amount of delay that is applied to the first packet before the first packet is forwarded into a core circuit switched network, and establishing a periodic time interval within which to convey subsequent packets originating from the access terminal; and
   a processor, coupled to the memory, configured to execute the instructions retained in the memory,
   wherein the memory further retains instructions related to utilizing a product of a difference between a maximum number of hybrid automatic repeat requests (HARQs) and the hybrid automatic repeat request (HARQ) within which the first packet is received and a spacing interval established between the maximum number of hybrid automatic repeat requests (HARQs).

16. The wireless communication apparatus of claim 15, wherein the memory further retains instructions related to identifying discontinuous transmission (DTXed) frames by extracting timestamp information included in a header associated with the first packet or the subsequent packets originating from the access terminal.

17. The wireless communications apparatus of claim 15, wherein the memory further retains instructions related to at least one of identifying fragmented packets attributable to the first packet or the subsequent packets originating from the access terminal or delaying conveyance of the first packet or the subsequent packets to the core circuit switched network until all fragmented packets attributable to the first packet or the subsequent packets have been received or reconstituted.

18. The wireless communications apparatus of claim 15, wherein the memory further retains instructions related to at least one of adaptively delaying conveyance of the first packet or the subsequent packets to the core circuit switched network to maintain an underflow rate established as a rate of arrival of packets later than a time at which the first packet or the subsequent packets are to be conveyed to the core circuit switched network, where the adaptively delaying conveyance of the first packet or the subsequent packets based at least in part on an initial delay established based at least in part on a difference between a transmission delay of the first packet and a product of a difference between a maximum number of hybrid automatic repeat requests (HARQs) and the hybrid automatic repeat request (HARQ) within which the first packet is received and a spacing interval established between the maximum number of hybrid automatic repeat requests (HARQs).

19. A non-transitory computer-readable medium, comprising:
    at least one instruction for causing a computer to receive a first packet originating from an access terminal;
    at least one instruction for causing the computer to determine within which hybrid automatic repeat request (HARQ) the first packet is received;
    at least one instruction for causing the computer to ascertain an amount of delay that is applied to the first packet before the first packet is forwarded into a core circuit switched network; and
    at least one instructions for causing the computer to establish a periodic time interval based at least in part on the amount of delay within which to convey subsequent packets originating from the access terminal,
    wherein the at least one instruction for causing the computer to ascertain further comprising causing the computer to utilize a product of a difference between a maximum number of hybrid automatic repeat requests (HARQs) and the hybrid automatic repeat request (HARQ) within which the first packet is received and a spacing interval established between the maximum number of hybrid automatic repeat requests (HARQs).

20. The non-transitory computer-readable medium of claim 19, further comprising at least one instruction for causing the computer to identify discontinuous transmission (DTXed) frames by extracting timestamp information included in a header associated with the first packet or the subsequent packets originating from the access terminal.

21. The non-transitory computer-readable medium of claim 19, further comprising at least one instruction for causing the computer to identify fragmented packets attributable to the first packet or the subsequent packets originating from the access terminal or delay conveyance of the first packet or the subsequent packets to the core circuit switched network until all fragmented packets attributable to the first packet or the subsequent packets have been received or reconstituted.

22. The non-transitory computer-readable medium of claim 19, further comprising at least one instruction for causing the computer to adaptively delay conveyance of the first packet or the subsequent packets to the core circuit switched network to maintain an underflow rate established as a rate of arrival of packets later than a time at which the first packet or the subsequent packets are to be conveyed to the core circuit switched network, where the adaptively delaying conveyance of the first packet or the subsequent packets based at least in part on an initial delay established based at least in part on a difference between a transmission delay of the first packet and a product of a difference between a maximum number of hybrid automatic repeat requests (HARQs) and the hybrid automatic repeat request (HARQ) within which the first packet is received and a spacing interval established between the maximum number of hybrid automatic repeat requests (HARQs).

23. The non-transitory computer-readable medium of claim 19, further comprising at least one instruction for causing the computer to send indication to the core circuit switched network where subsequent packets are not received within the periodic time interval within which to convey subsequent packets originating from the access terminal.

\* \* \* \* \*